Patented Feb. 12, 1929.

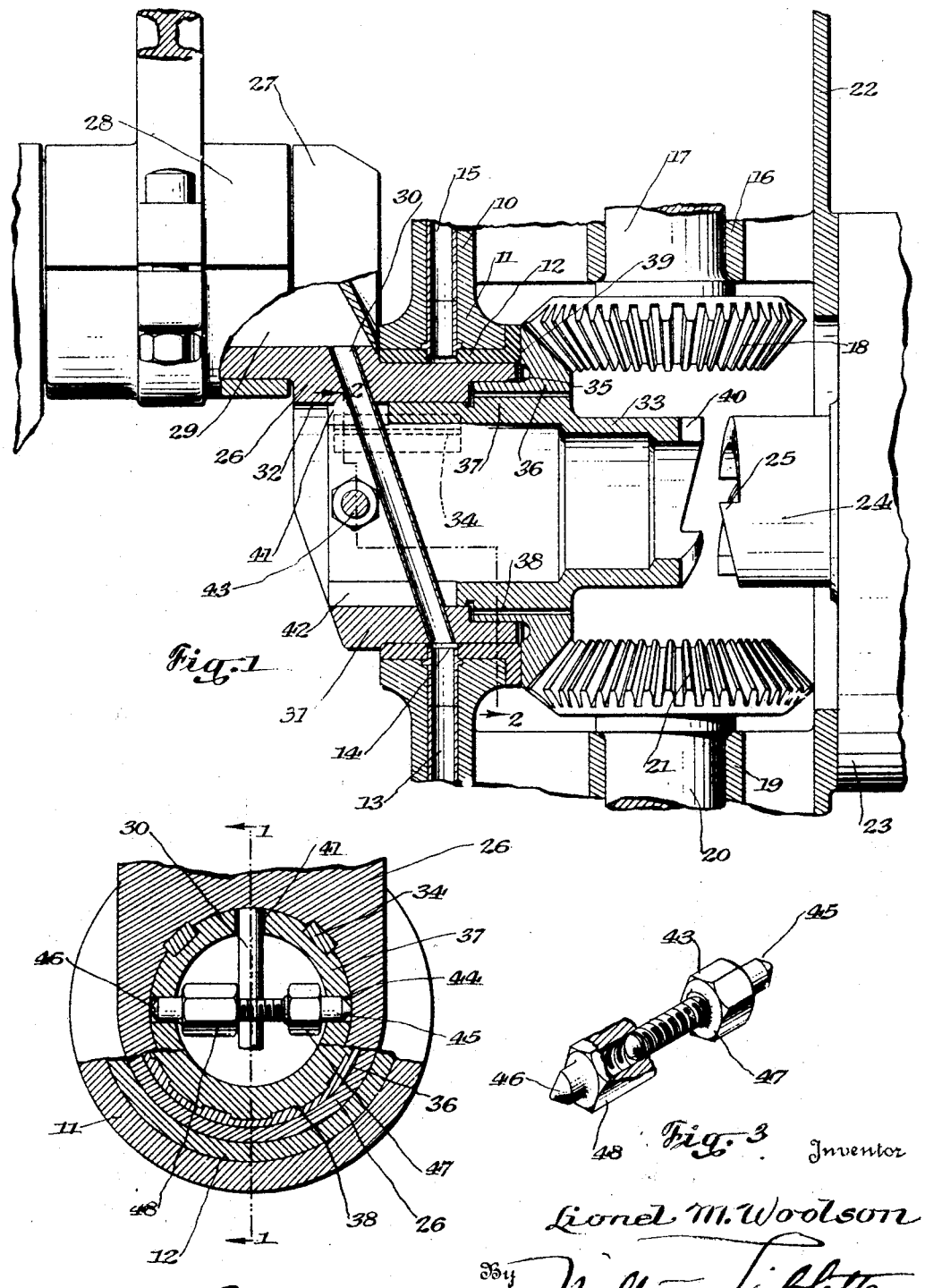

1,701,551

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed December 7, 1923. Serial No. 679,066.

This invention relates to internal combustion engines and particularly to crankcase and crankshaft construction thereof.

In internal combustion engines in which the camshaft or other auxiliary shafts of the engine are driven through gearing from the crankshaft, it is of considerable importance that the gears be so mounted that they will retain their proper mesh and thereby remain quiet in operation. Bevel gears are frequently used for driving these auxiliary shafts and the gear that is connected to the crankshaft is usually formed separately from the shaft because it is difficult if not impossible to form it as an integral part thereof. In fact, it is desirable to have as little machine work done on the end of the crankshaft as possible and it is desirable also that the gear shall be mounted on the crankshaft on some cylindrical part thereof which is concentric with the crankshaft bearing, rather than mounting it on a threaded part which cannot be made concentric within close enough limits to warrant quiet operation. Because of these requirements and because of the lack of space usually found at the end of the crankshaft, and because also of the slight endwise movement of the crankshaft itself in its bearings in the operation of the engine, there are serious difficulties in the way of mounting the gears and other members adjacent the crankshaft end.

One of the objects of the present invention is to provide a novel and simple mounting for a gear at the end of the crankshaft of an internal combustion engine.

Another object of the invention is to provide a gear mounting on a crankshaft such that the gear will run quietly with its mate.

Another object of the invention is to provide a keyed mounting for the jaw clutch member without threaded connection to the crankshaft.

Another object of the invention is to provide a gear mounting on the crankshaft without threaded connection therewith.

Another object of the invention is to provide a gear mounting on the end of the crankshaft with a bearing for the gear directly against the crankcase bearing and with provision for suitably lubricating the moving parts.

Another object of the invention is to provide a short and compact mounting for a member within the hollow end of the crankshaft.

Other objects of the invention will appear from the following description taken in connection with the drawings, which form a part of this specification, and in which:

Fig. 1 is a longitudinal section through the crankcase and the crankshaft of an internal combustion engine embodying the invention;

Fig. 2 is a transverse section substantially on the line 2—2 of Fig. 1, and

Fig. 3 is a detail view showing the expanding member for retaining the jaw clutch member in place.

Referring to the drawings, 10 represents the crankcase of an internal combustion engine, 11 being the supporting part of the crankcase for one of the main bearing members 12 thereof. Lubricating means for this bearing member are indicated at 13, the pipe shown being adapted for connection with a suitable pressure pump driven by the engine. The bearing member is formed with an annular groove 14 in its inner face so that lubricant is carried entirely around the bearing and squeezed out at both ends thereof.

A pipe 15 carries excess oil to other bearings of the engine.

The crankcase is also shown as provided with a bearing 16 which supports a shaft 17 on which is a bevel gear 18, this shaft and gear being arranged to drive the camshaft or other auxiliary shaft of the engine. A similar bearing 19, shaft 20 and gear 21, are shown in the lower part of Fig. 1 of the drawing. A front cover 22 which is usually detachable also forms a part of the crankcase and a starting device 23 is shown as secured to this front cover. This may be either a hand starting device or an electric starting motor and in either case there will be a shaft 24 having jaws 25 for connection with suitable jaws on the crankshaft of the engine. The shaft 24 may be moved towards the engine crankshaft for clutching with the crankshaft jaws referred to, and they are automatically thrown out of action by the beveled faces of the jaws.

The engine crankshaft is indicated at 26 and only one end of the shaft is shown. One of its crank parts is indicated at 27 and a connecting rod 28 is shown as mounted thereon. The crank part 27 is hollow as at 29 for receiving oil through a pipe 30 which extends diagonally from the chamber 29 to the annular groove 14 in the bearing member 12 of the crankcase. Thus some of the oil from the oil supply pipe 13 is fed to the chamber 29 and from there to the bearing of the connecting rod 28.

One of the main bearing portions of the crankshaft is indicated at 31 and this portion is shown as hollow and as mounted in the bearing member 12 above referred to. The oil pipe 30 extends diagonally across the opening in this bearing portion of the crankshaft.

The crankshaft portion 31 is drilled and ground in two diameters, the smaller diameter 32 being adapted to receive a member 33 keyed thereto as by keys 34, and the larger diameter 35 is adapted to receive a bevel gear 36 which meshes with the gears 18 and 21 above referred to. The cylindrical ground surface 35 is concentric with the outer cylindrical surface of the bearing portion 31 so that the gear 36 will run absolutely true in the bearing member 12. The gear 36 is splined to an enlarged portion 37 of the member 33, as shown at 38 in both Figs. 1 and 2, so that the gear 36 may move axially relative to said member 33 and consequently relative to the crankshaft 26. The back of the gear 36 has an endwise bearing against the end of the bearing member 12, as shown at 39, and it is this bearing which determines the position of the gear 36 relative to the bevel gears 18 and 21 with which it meshes. From this it will be seen that no endwise movement of the crankshaft will be transmitted to the gear 36.

The member 33 is formed at one end with jaws 40 for engaging the jaws 25 of the starting mechanism above referred to. Near its other end the member 33 is formed with slots 41 and 42 to receive the pipe 30 as shown in the drawings.

For retaining the member 33 against endwise movement, an expanding device 43 is provided. The member 33 is formed with aligned holes 44, as shown particularly in Fig. 2, and the ends 45 and 46 of the expanding device extend through these holes into contact with the interior surface 32 of the crankshaft. The expanding device 43 is formed in two parts 47 and 48, as shown, and threaded together so that relative rotation will expand the ends 45 and 46 against the crankshaft surface. After the parts have been assembled as shown in Fig. 1, the two parts of the device 43 are relatively rotated and their ends expanding against the surface 32 of the crankshaft and the friction between those ends and the said surface will prevent the member 33 from being withdrawn or being accidentally loosened.

By the arrangement of the gear 36 with a bearing against the end of the bearing member 12, lubrication thereof is assured by reason of the oil squeezed through the crankshaft bearing to the end of the bearing member 12. The overflow of lubricant will lubricate the gears 18, 21 and 36.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an internal combustion engine, the combination with the crankshaft thereof having cylindrical surfaces concentric with its main bearing part, of a gear having a part in contact with one of said cylindrical surfaces, and a member secured to said crankshaft against the other of said cylindrical surfaces and keyed to said gear.

2. In an internal combustion engine, the combination with the crankshaft thereof having a hollow bearing part, said bearing part having a larger and a smaller internal cylindrical surface concentric with the axis of the shaft, of a gear bearing against the larger of said cylindrical surfaces, and a member bearing against the other of said cylindrical surfaces and keyed to said gear.

3. In an internal combustion engine, the combination with the crankcase thereof having a bearing, of a crankshaft mounted in said bearing and having a gear mounted in the end thereof in direct contact with one end of said bearing.

4. In an internal combustion engine, the combination with the crankcase thereof having a bearing, of a crankshaft mounted in said bearing, a gear keyed to the crankshaft so that it may have slight movement axially thereof, said gear having an endwise bearing on one end of said crankcase bearing.

5. In an internal combustion engine, the combination with the crankshaft, of a member detachably mounted in the end of said crankshaft, and a gear keyed to said member.

6. In an internal combustion engine, the combination with the crankshaft thereof having a cylindrical surface concentric with its main bearing part, of a gear having a part in contact with said concentric cylindrical surface, and a member secured to said crankshaft and keyed to said gear.

7. In an engine, the combination of a crankshaft having a hollow main bearing portion, a member mounted within said hollow main bearing portion and keyed thereto, and means within said member for securing the member against endwise movement.

8. In an engine, the combination of a crankshaft having a hollow main bearing portion, a member mounted within said hollow main bearing portion and keyed thereto, and an expanding device in said member for retaining the latter against endwise movement in the crankshaft.

9. In an engine, the combination of a crankshaft having a hollow end portion, a member keyed within said end portion, and a gear mounted on said member.

10. In an engine, the combination of a crankshaft having a hollow end portion, a jaw clutch member mounted within said end portion and keyed to the crankshaft, and an expanding bolt in said member arranged to retain the member against endwise movement in the crankshaft.

11. In an internal combustion engine, the combination with the crankcase having a main bearing, and means for feeding oil to said main bearing, of a crankshaft mounted in said main bearing and having a hollow end part, an oil pipe in the crankshaft extending across said hollow part, and a member mounted within said hollow part and having notches to receive said pipe.

12. In an internal combustion engine, the combination with the crankcase having a main bearing member and means for feeding lubricant to said bearing member, of a crankshaft having a part mounted in said bearing member, and a gear supported in the end of said crankshaft and contacting with the end of said bearing member.

13. In an internal combustion engine, the combination with the crankcase having a main bearing member, of a crankshaft having a bearing in said member, a second shaft mounted in said crankcase at right angles to said crankshaft, a bevel gear on said latter shaft, and a second bevel gear in mesh with the first said bevel gear and mounted in the end of said crankshaft with its back in contact with the end of said bearing member.

In testimony whereof I affix my signature.

LIONEL M. WOOLSON.